United States Patent
Ueda et al.

(10) Patent No.: US 7,853,394 B2
(45) Date of Patent: Dec. 14, 2010

(54) INTERNAL COMBUSTION ENGINE FEEDBACK CONTROL WITH VARIABLY SET GAIN

(75) Inventors: Koichi Ueda, Susono (JP); Kota Sata, Susono (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 400 days.

(21) Appl. No.: 12/095,631

(22) PCT Filed: Jun. 6, 2007

(86) PCT No.: PCT/IB2007/001497

§ 371 (c)(1),
(2), (4) Date: May 30, 2008

(87) PCT Pub. No.: WO2007/141633

PCT Pub. Date: Dec. 13, 2007

(65) Prior Publication Data

US 2010/0268433 A1    Oct. 21, 2010

(30) Foreign Application Priority Data

Jun. 7, 2006    (JP) .............................. 2006-158858

(51) Int. Cl.
*F02D 45/00* (2006.01)
*F02P 5/15* (2006.01)

(52) U.S. Cl. ..................................... 701/102
(58) Field of Classification Search ................ 701/102, 701/101, 111, 115; 123/406.33, 690, 674
See application file for complete search history.

(56) References Cited

U.S. PATENT DOCUMENTS

| 4,964,386 | A | | 10/1990 | Akiyama et al. |
| 6,152,105 | A | * | 11/2000 | Nishimura et al. .......... 701/111 |

FOREIGN PATENT DOCUMENTS

| GB | 2 252 425 A | | 8/1992 |
| GB | 2 314 946 A | | 1/1998 |
| JP | 3-88941 A | | 4/1991 |
| JP | 9-303243 A | | 11/1997 |
| JP | 2002-188501 A | | 7/2002 |
| JP | 2004-92603 A | | 3/2004 |
| JP | 2005-282393 A | | 10/2005 |
| JP | 2006-16972 A | | 1/2006 |
| JP | 2006-125264 A | | 5/2006 |
| JP | 2006-274880 A | | 10/2006 |
| JP | 2007-327406 A | * | 12/2007 |

* cited by examiner

*Primary Examiner*—Hieu T Vo
(74) *Attorney, Agent, or Firm*—Sughrue Mion, PLLC (57) ABSTRACT

A controller (6) for an internal combustion engine includes: a calculation section (5) for calculating an angular acceleration or an angular velocity; an operational status-determining section (5, 6) for determining an operational status based on the angular acceleration or the angular velocity; a gain-setting section (6, 3a) for setting a gain of torque based on feedback control; and a control section (6) for controlling the gain-setting section so that, when the operational status is a first operational status, the gain-setting section uses the angular acceleration as input data to set the gain (i), and when the operational status is a second operational status, the gain-setting section uses the angular velocity as input data to set the gain (ii).

22 Claims, 8 Drawing Sheets

$$E(k) = \frac{1}{2} J \{\omega(k)\}^2$$

PERIOD ELIMINATING INFLUENCE OF RECIPROCATION INERTIA

INTERNAL COMBUSTION ENGINE FEEDBACK CONTROL WITH VARIABLY SET GAIN

BACKGROUND OF THE INVENTION

1. Field of the Invention

The present invention relates to a controller for an internal combustion engine and a method of controlling an internal combustion engine, in which a gain of torque that is required to operate an internal combustion engine, for example, is set.

2. Description of the Related Art

Japanese Patent Application Publication No. 9-303243 (JP-A-9-303243), and Japanese Patent Application Publication No. 2004-92603 (JP-A-2004-92603), for example, describe technologies for reducing the irregularity of combustion in all the cylinders by detecting angular acceleration with respect to predetermined two crank angle ranges (CA: Crank Angle) during each expansion stroke in a plurality of cylinders, and correcting the amount of fuel injection and/or the ignition timing of the cylinders based on the difference between the all-cylinder average of the detected angular acceleration and the each-cylinder average thereof.

However, with regard to the technologies described in JP-A-9-303243 and JP-A-2004-92603, it is difficult to realize appropriate feedback control during or immediately after startup of the internal combustion engine, or during warm up of the engine (during fast idle), in which changes in the external environment and/or the operational status are more significant than those when the engine is in steady operation. Accordingly, the possibility that drivability is reduced (that is, the possibility that frequency of occurrence of irregular variation of rotation is increased, for example), and/or the possibility that unwanted components, such as hydrocarbon, increase in exhaust gas, increase. More specifically, with regard to the technologies described in JP-A-9-303243 and JP-A-2004-92603 cited above, because the same feedback control is adopted both during an unstable, transient driving condition during which variation in required torque is significant, and during relatively stable, steady operation, it is technically difficult to realize highly precise feedback control in each operational status.

SUMMARY OF THE INVENTION

The present invention provides a controller for an internal combustion engine with which it is possible to set an optimal gain according to various operational statuses that occur during startup of the internal combustion engine, for example.

A controller for an internal combustion engine according to an aspect of the present invention includes: a calculation section for calculating an angular acceleration or an angular velocity of a crankshaft of a crank mechanism of the internal combustion engine; an operational status-determining section for determining an operational status (such as whether the mode is a startup mode) of the internal combustion engine based on the angular acceleration or the angular velocity; a gain-setting section for setting a gain of torque that is required to operate the internal combustion engine, based on feedback control (automatic control) using the angular acceleration or the angular velocity as input data; and a control section for controlling the gain-setting section so that, when it is determined that the operational status is a first operational status (startup mode or rotation reduction mode), the gain-setting section uses the angular acceleration as input data to set the gain, and when it is determined that the operational status is a second operational status (fast idle mode), the gain-setting section uses the angular velocity as input data to set the gain.

With the controller for an internal combustion engine according to the aspect of the present invention, the calculation section calculates the angular acceleration or the angular velocity of the crankshaft of the crank mechanism the internal combustion engine. At the same time, or before or after this calculation, the operational status-determining section determines the operational status of the internal combustion engine based on the angular acceleration or the angular velocity. The "operational status" according to the aspect of the present invention means the driving status of the internal combustion engine, which includes the torque generation status and the rotation speed of the crankshaft (that is, the crank angular velocity) depending on the combustion status, for example, in the internal combustion engine. It is possible to estimate the operational status based on the calculated angular acceleration or angular velocity. At the same time, or before or after the determination, the gain-setting section sets a gain of torque that is required to operate an internal combustion engine, based on the feedback control (automatic control) using the angular acceleration or the angular velocity as input data.

In particular, according to the aspect of the present invention, under control performed by the control section, when it is determined that the operational status is the first operational status (startup mode or rotation reduction mode, described later), the gain-setting section uses the angular acceleration as input data to set the gain. When it is determined that the operational status is the second operational status (fast idle mode, described later), the gain-setting section uses the angular velocity as input data to set the gain. That is, because the input data for the feedback control are switched corresponding to the first operational status or the second operational status under control performed by the control section, such as an ECU (Engine Control Unit), so that it is possible to set an optimal gain in each operational status.

As a result, it becomes possible to set, according to various operational statuses, an optimal gain that is hardly or not affected either by changes in the external environment (temperature, for example) of the internal combustion engine, or by changes in the operational status, such as changes in torque required of the internal combustion engine, during startup of the internal combustion engine, immediately after the engine is started, or during warm up of the engine, for example. Thus, it is possible to realize highly precise control of an internal combustion engine, to realize responsive and appropriate drivability (that is, the internal combustion engine that outputs torque, appropriately and quickly responding to the operation by a driver), and to realize significant reduction in unwanted components, such as hydrocarbon, in exhaust gas.

According to an aspect of the controller for an internal combustion engine according to the present invention, when the first operational status is a first starting operational status (startup mode), in which the angular velocity is less than a desired angular velocity, that occurs during startup of the internal combustion engine until the angular velocity reaches the desired angular velocity, the control section controls the gain-setting section so that the gain-setting section sets the gain based on the feedback control performed to set the angular acceleration to a desired value (positive constant value, for example).

According to this aspect, during an operational status (startup mode), in which angular velocity is less than the desired angular velocity, that occurs during startup of the internal combustion engine until the angular velocity reaches the desired angular velocity, for example, the gain-setting section sets a gain based on the feedback control that is performed to set angular acceleration to a desired angular acceleration, such as a constant value (positive constant value). Accordingly, it becomes possible to significantly enhance the response of the feedback control in the period until the desired angular velocity is reached, and in addition, to realize highly precise feedback control.

If feedback control is performed using angular velocity (crank rotation speed) as input data, because the influence of reciprocation inertia of the pistons and others is large, it becomes impossible to accurately extract information on combustion in the internal combustion engine, that is, information indicating the level of torque produced by the gas pressure in the cylinders. Thus, it becomes technically difficult to perform appropriate feedback control in a transient state in which angular velocity is significantly varied.

On the other hand, if feedback control is performed using angular acceleration as input data, it is possible to accurately extract information on combustion for each explosion in the cylinders of the internal combustion engine on a cylinder-by-cylinder basis, for example. Thus, during an operational status (startup mode), in which angular velocity is less than the desired angular velocity, that occurs during startup of the internal combustion engine until the angular velocity reaches the desired angular velocity, for example, it is possible to significantly enhance the response of the feedback control up to the time when the desired angular velocity is reached, and in addition, to realize a highly precise feedback control.

According to another aspect of the controller for an internal combustion engine according to the present invention, when the first operational status is a first rotation-varying operational status (rotation reduction mode), in which the angular velocity is not within a predetermined range of angular velocities including a desired angular velocity, that occurs when the internal combustion engine is in steady operation, the control section controls the gain-setting section so that the gain-setting section sets the gain based on the feedback control performed to set the angular acceleration to substantially zero (zero±α).

According to this aspect, during a first rotation-varying operational status (rotation reduction mode), in which angular velocity is not within a predetermined range of angular velocities including the desired angular velocity, that occurs when the internal combustion engine is in steady operation, the gain-setting section sets a gain based on the feedback control that is performed to set angular acceleration to the predetermined angular acceleration, such as a constant value (substantially zero), under control performed by the control section. Thus, it is possible to accurately extract changes in information on combustion for each explosion in the cylinders of the internal combustion engine on a cylinder-by-cylinder basis, for example. Thus, unexpected variation of angular velocity (crank rotation speed) when the internal combustion engine is in operation, for example, can be more quickly and accurately determined than actual variation of angular velocity, which makes it possible to quickly respond to changes in information on combustion to realize appropriate feedback control. In this way, it is possible to more quickly restore angular velocity to the desired angular velocity.

According to another aspect of the controller for an internal combustion engine according to the present invention, the controller may be configured so that, when the first operational status is a first rotation-varying operational status, in which the angular velocity is not within a predetermined range of angular velocities including a desired angular velocity, that occurs when the internal combustion engine is in steady operation, the control section controls the gain-setting section so that the gain-setting section sets the gain based on the feedback control performed to set an integral of the angular acceleration to substantially zero or a constant value.

According to this aspect, during a first rotation-varying operational status (rotation reduction mode), in which angular velocity is not within a predetermined range of angular velocities including the desired angular velocity, that occurs when the internal combustion engine is in steady operation, the gain-setting section sets a gain based on the feedback control that is performed to set the integral of angular acceleration to the predetermined angular acceleration, such as substantially zero or a constant value, under control performed by the control section. Thus, it is possible to accurately extract changes in information on combustion for each explosion in the cylinders of the internal combustion engine on a cylinder-by-cylinder basis, for example. Thus, unexpected variation of angular velocity (crank rotation speed) when the internal combustion engine is in operation, for example, can be more quickly and accurately determined than actual variation of angular velocity, which makes it possible to quickly respond to changes in information on combustion to realize appropriate feedback control. In this way, it is possible to more quickly restore angular velocity to the desired angular velocity.

According to another aspect of the controller for an internal combustion engine according to the present invention, when the second operational status (FI mode) is any one of (i) an operational status, in which the angular acceleration is within a predetermined range of angular accelerations including zero, and (ii) an operational status, in which the angular velocity is within a predetermined range of angular velocities including a desired angular velocity, that occur when the internal combustion engine is in steady operation, the control section controls the gain-setting section so that the gain-setting section sets the gain based on the feedback control performed to set the angular velocity to a constant value (positive constant value).

According to this aspect, during an operational status, such as (i) an operational status (fast idle mode) in which angular acceleration is within a predetermined range of angular accelerations including zero, or (ii) an operational status (fast idle mode) in which angular velocity is within a predetermined range of angular velocities including the desired angular velocity, that occurs when the internal combustion engine is in steady operation, for example, the gain-setting section sets a gain based on the feedback control that is performed to set angular velocity to a constant value (a constant positive value) under control performed by the control section. Accordingly, it is possible to realize feedback control that makes it possible to compensate steady deviations, such as fuel properties. In addition, it is possible to realize steady feedback control that adequately meets the required response corresponding to a small variation in input data.

If angular acceleration is used as the input data in a relatively steady operational status in which angular velocity is substantially constant, the amount of input data is greater than needed. In this case, the control becomes unnecessarily sensitive to the input data, divergence of feedback control, such as hunting, occurs, and it becomes technically difficult to perform appropriate feedback control. In addition, when the internal combustion engine is in steady operation, the influence of the error in the time derivative due to machining error of the rotor becomes significant, and the accuracy of the calculated angular acceleration therefore becomes low. As a result, angular acceleration becomes inadequate as input data used in feedback control.

On the other hand, if the feedback control is performed using angular velocity as input data, it is possible to realize steady feedback control. Thus, when the internal combustion engine is in steady operation, for example, it is possible to realize feedback control that makes it possible to compensate steady deviations, such as fuel properties, and at the same time, it is possible to realize steady feedback control that adequately meets the required response corresponding to a small variation in input data.

Another aspect of the controller for an internal combustion engine according to the present invention may further include an energy-calculating section for calculating rotational energy of the crank mechanism based on the angular acceleration or the angular velocity, wherein the gain-setting section may include a first setting section that uses the angular acceleration as input data to set the gain, and a second setting section that uses the angular velocity to set the gain, and wherein the control section may switch from one of control performed using the first setting section and control performed using the second setting section to the other based on the calculated rotational energy.

According to this aspect, the energy-calculating section calculates the rotational energy of the crank mechanism (that is, the energy associated with the angular velocity) based on the angular acceleration or the angular velocity. The first setting section uses the angular acceleration as input data to set the gain. The second setting section uses the angular velocity to set the gain.

The control section switches from one of control performed using the first setting section and control performed using the second setting section to the other based on the calculated rotational energy. The rotational energy herein means the kinetic energy of the rigid body of the rotating system. The rotational energy is calculated for each predetermined period described later that allows information on combustion, that is, information indicating the magnitude of torque produced by the gas pressure in the cylinders to be correctly reflected in the rotational energy.

If the switching between the control performed using the first setting section and the control performed using the second setting section is performed based on angular acceleration or angular velocity instead of rotational energy, the switching is affected by physical factors, such as the inertial torque produced by reciprocation mass of the pistons, and by measurement factors (noise), such as the error in the time derivative due to machining error of the rotor in determining the angular acceleration or the angular velocity, for example. Accordingly, the possibility arises that switching timing becomes inappropriate, and that feedback control therefore diverges.

On the other hand, according to the above aspect of the present invention, the control section switches from one of control performed using the first setting section and control performed using the second setting section to the other based on the calculated rotational energy. Consequently, it is possible to quickly set an optimal gain by switching among the above-described processes in the feedback control in which a gain is set, according to various operational statuses at appropriate times based on the rotational energy, with which it is possible to significantly reduce or eliminate the influence of the factors, such as inertial torque produced by reciprocation mass of the rigid bodies including the pistons and the crank mechanisms. Accordingly, it is possible to realize highly precise control of the internal combustion engine, and to realize responsive and appropriate drivability (that is, the internal combustion engine that outputs torque, appropriately and quickly responding to the operation by a driver).

With regard to an aspect concerning the control section described above, the controller may be configured so that the energy-calculating section calculates the rotational energy for each predetermined period defined by a crank angle range of the crankshaft, and, during startup, or while rotation speed is reduced, when the angular velocity is higher than a predetermined angular velocity and a rate of change in the rotational energy calculated for each predetermined period is less than a predetermined rate of change, the control section switches from the control performed using the first setting section to the control performed using the second setting section, or when the angular velocity is lower than the predetermined angular velocity and the rate of change in the rotational energy calculated for each predetermined period is greater than the predetermined rate of change, the control section switches from the control performed using the second setting section to the control performed using the first setting section.

With this configuration, it is possible to quickly set an optimal gain by performing the switching according to various operational statuses at more appropriate times based on the rate of change in rotational energy.

With regard to an aspect concerning the predetermined period, the predetermined period may be specified so that each average of torque corresponding to the inertial motion of the crank mechanism that is taken over the predetermined period is constant.

With this configuration, it is possible to quickly set an optimal gain by performing the switching according to various operational statuses at more appropriate times based on the rate of change in rotational energy that is calculated for each predetermined period specified so that the average of inertial torque corresponding to inertial motion of the crank mechanism is constant.

With regard to an aspect concerning the predetermined period, the predetermined period may be specified based on the number of cylinders that an internal combustion engine has.

With this configuration, it is possible to quickly set an optimal gain by performing the switching according to the properties and characteristics of the internal combustion engine, and at the same time, according to various operational statuses at more appropriate times based on the rate of change in rotational energy that is calculated for each predetermined period specified based on the number of cylinders that an internal combustion engine has.

With regard to an aspect concerning the predetermined period, the predetermined period may be specified based on the crank angle range obtained by dividing 720 degrees by the number of cylinders.

With this configuration, it is possible to quickly set an optimal gain by performing the switching according to various operational statuses at more appropriate times based on the rate of change in rotational energy that is calculated for each predetermined period specified based on the number of cylinders of a four-cycle internal combustion engine.

Another controller for an internal combustion engine according to an aspect of the present invention includes: a calculation section for calculating an angular acceleration or an angular velocity of a crankshaft of a crank mechanism of the internal combustion engine; an energy-calculating section for calculating rotational energy of the crank mechanism based on the angular acceleration or the angular velocity; a first setting section for setting a gain of torque that is required to operate the internal combustion engine, based on feedback control using the angular acceleration as input data; a second setting section for setting a gain of torque that is required to operate the internal combustion engine, based on feedback control using the angular velocity as input data; and a control section that switches from one of control performed using the first setting section and control performed using the second setting section to the other based on the calculated rotational energy.

With the another controller for an internal combustion engine according to the aspect of the present invention, the calculation section calculates the angular acceleration or the angular velocity. At the same time, or before or after this calculation, the energy calculation section calculates rotational energy of the crank mechanism (that is, the energy associated with the angular velocity) based on the angular acceleration or the angular velocity. The first setting section uses the angular acceleration as input data to set the gain. The second setting section uses the angular velocity to set the gain. The control section switches from one of control performed using the first setting section and control performed using the second setting section to the other based on the calculated rotational energy.

Consequently, it is possible to quickly set an optimal gain by switching among the above-described processes in the feedback control in which a gain is set, according to various operational statuses at appropriate times based on the rotational energy, with which it is possible to significantly reduce or eliminate the influence of the factors, such as inertial torque produced by reciprocation mass of the rigid bodies including the pistons and the crank mechanisms. Accordingly, it is possible to realize highly precise control of the internal combustion engine, and to realize responsive and appropriate drivability (that is, the internal combustion engine that outputs torque, appropriately and quickly responding to the operation by a driver).

The embodiments according to the another controller for an internal combustion engine according to the aspect of the present invention may take various aspects corresponding to the various aspects that the embodiments according to the controller for an internal combustion engine according to the aspect of the present invention described above take.

A method of controlling an internal combustion engine according to an aspect of the present invention includes: calculating an angular acceleration or an angular velocity of a crankshaft of a crank mechanism of the internal combustion engine; determining an operational status (such as whether the mode is the startup mode) of the internal combustion engine based on the angular acceleration or the angular velocity; setting a gain of torque that is required to operate the internal combustion engine, based on feedback control (automatic control) using the angular acceleration or the angular velocity as input data; and controlling the gain-setting step so that, when it is determined that the operational status is a first operational status (startup mode or rotation reduction mode), the setting step uses the angular acceleration as input data to set the gain, and when it is determined that the operational status is a second operational status (fast idle mode), the setting step uses the angular velocity as input data to set the gain.

According to the method of controlling an internal combustion engine according to this aspect of the present invention, it is possible to enjoy various advantages that the embodiments according to the controller for an internal combustion engine according to the aspect of the present invention described above have.

The embodiments according to the method of controlling an internal combustion engine according to the aspect of the present invention may take various aspects corresponding to the various aspects that the embodiments according to the controller for an internal combustion engine according to the aspect of the present invention described above take.

Another method of controlling an internal combustion engine according to an aspect of the present invention includes: calculating an angular acceleration or an angular velocity of a crankshaft of a crank mechanism of the internal combustion engine; calculating rotational energy of the crank mechanism based on the angular acceleration or the angular velocity; a first setting step of setting a gain of torque that is required to operate the internal combustion engine, based on feedback control using the angular acceleration as input data; a second setting step of setting a gain of torque that is required to operate the internal combustion engine, based on feedback control using the angular velocity as input data; and switching from one of control performed using the first setting step and control performed using the second setting step to the other based on the calculated rotational energy.

According to the another method of controlling an internal combustion engine according to the aspect of the present invention, it is possible to enjoy various advantages that the embodiments according to the another controller for an internal combustion engine according to the aspect of the present invention described above have.

The embodiments according to the another method of controlling an internal combustion engine according to the aspect of the present invention may take various aspects corresponding to the various aspects that the embodiments according to the another controller for an internal combustion engine according to the aspect of the present invention described above take.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

An example embodiment of the present invention will be described below with reference to drawings.

Figure 1:
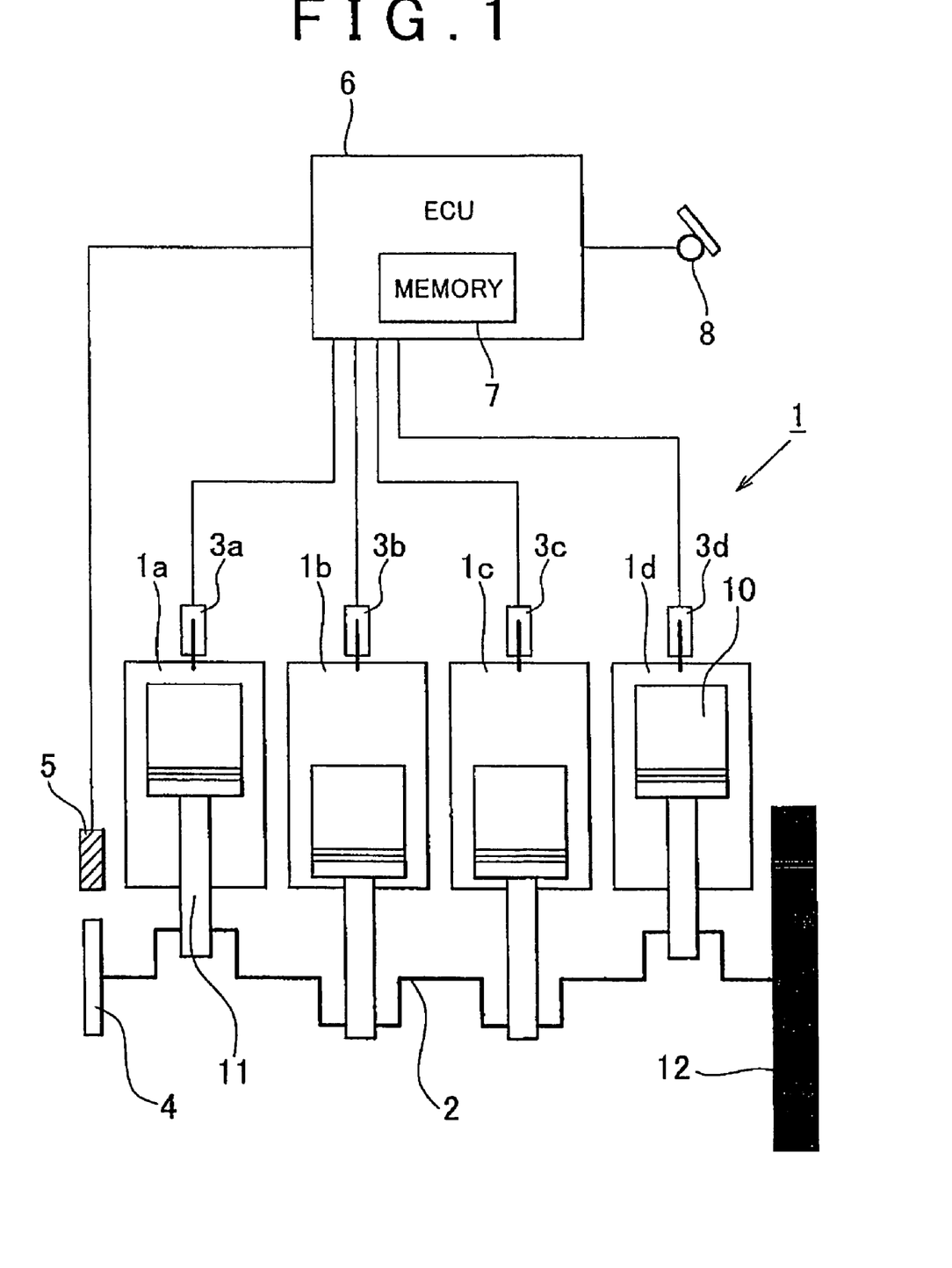
FIG. 1 is a schematic diagram showing a basic configuration of a vehicle in which an internal combustion engine controller according to an embodiment is installed.

First, a basic configuration of a vehicle in which an internal combustion engine controller according to the embodiment is installed will be described with reference to FIG. 1. FIG. 1 is a schematic diagram schematically showing the basic configuration of the vehicle in which the internal combustion engine controller according to the embodiment is installed. In the vehicle in which the internal combustion engine controller according to the embodiment is installed, torque output from a so-called in-line four-cylinder reciprocating engine (hereinafter referred to as the "engine", as appropriate) 1, in which four cylinders 1a to 1d, that is, a #1 cylinder (1a) to a #4 cylinder (1d), are arranged in a row, is estimated based on variation of the crank angular velocity (hereinafter referred to as the "angular velocity", as appropriate) of a crankshaft 2. The engine 1 is used as a driving power source for an automobile, for example.

As shown in FIG. 1, the vehicle in which the fuel injection controller of the internal combustion engine according to the embodiment is installed includes the engine 1, the crankshaft 2, ignition plugs 3a to 3d, a crank angle sensor 5, an engine control unit 6, a memory 7, an accelerator pedal operation amount sensor 8, pistons 10, connecting rods 11, and a flywheel 12.

The engine 1 is provided with a crank angle sensing system (not shown) for sensing the rotational position (crank angle) of the crankshaft 2. The crank angle sensing system includes: a rotor 4 that rotates with the crankshaft 2; and a crank angle sensor 5, which may be regarded as a crank angle signal output unit, positioned so as to face the outer circumference of the rotor 4. The outer circumference of the rotor 4 is provided with protrusions (not shown) that are arranged along the circumference at certain intervals, such as 30-degree intervals. The crank angle sensor 5 outputs a predetermined detection signal in response to the detection of each protrusion. The outer circumference of the rotor 4 is provided with a reference position-indicating portion (not shown), such as a notch, for determining the rotational position of the crankshaft 2. The crank angle sensor 5 outputs a particular, reference detection signal when the reference position-indicating portion is detected.

The output signal from the crank angle sensor 5 is led to the engine control unit 6 (hereinafter referred to as the "ECU (Engine Control Unit)", as appropriate, which is an embodiment of the control section according to the present invention). The ECU 6, which is a computer unit having a microprocessor, executes various engine control programs stored in the memory 7 to operate fuel injection valves (not shown) etc., thereby controlling the operational status of the engine 1. The memory 7 is constituted of a semiconductor memory, such as a ROM, an SRAM and a RAM. The ECU 6 determines the crank angle by counting the number of protrusion detection signals using, as the reference, the reference detection signal, which is output from the crank angle sensor 5. The ECU 6 determines the crank angular velocity (or the rotation speed of the engine 1) by measuring the time intervals between the detection signals output from the crank angle sensor 5. In this way, the ECU 6 functions as a calculation section for calculating the crank angular velocity.

The ECU 6 includes a CPU (Central Processing Unit), a ROM, a RAM, an A/D converter and an input/output interface. The ECU 6 performs control processes and various determination processes based on the detection signals supplied from the various sensors. The ECU 6 executes programs for estimating torque that are stored in the memory 7, thereby functioning as a control section, a gain-setting section, and an energy-calculating section of the present invention. The ignition plugs 3a to 3d are connected to the ECU 6 to adjust ignition timing as one manipulated variable for feedback control of torque. An accelerator pedal operation amount sensor 8, which functions as a sensor used to adjust air intake as another manipulated variable for feedback control of torque, is connected to the ECU 6. In addition, various sensors, such as an air flow meter for measuring air intake and an A/F sensor for outputting a signal corresponding to the air/fuel ratio of exhaust gas, are connected to the ECU 6. However, description of these sensors is omitted.

The memory 7 may store various maps as data that the ECU 6 uses to function as various correction sections.

Next, the feedback control performed according to the operational status according to the embodiment will be described with reference to FIGS. 2A, 2B and 3.

Figure 2A:
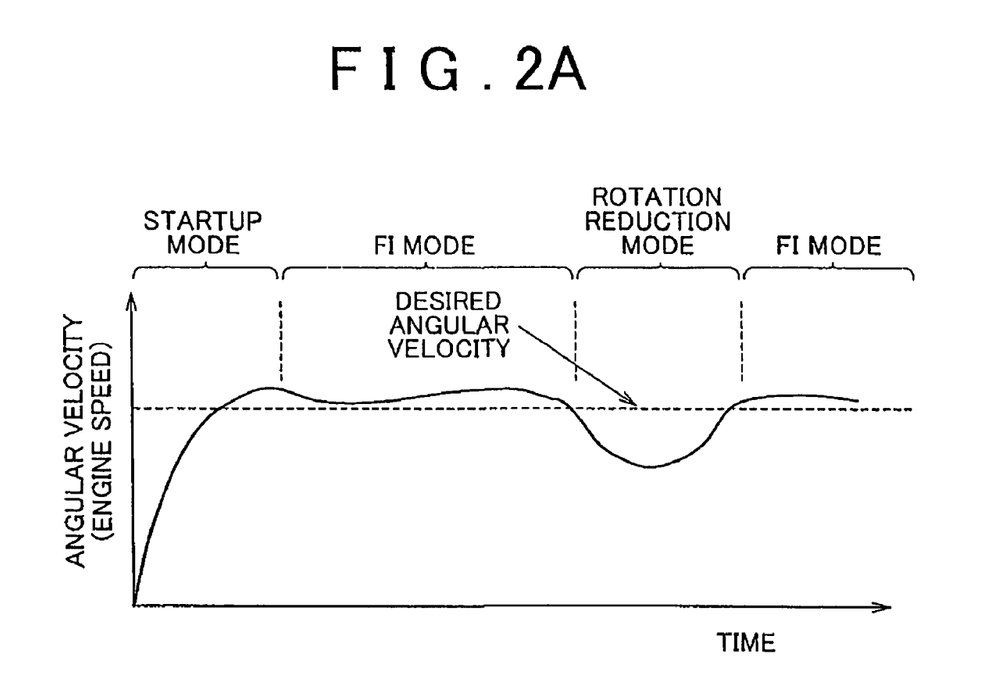
FIG. 2A is a graph showing variation of angular velocity along the time axis while the feedback control according to the embodiment is performed according to the operational status of the internal combustion engine.

FIG. 2A is a graph showing variation of angular velocity along the time axis while the feedback control according to the embodiment is performed according to the operational status of the internal combustion engine. FIG. 2B is a graph showing variation of angular acceleration along the time axis while the feedback control according to the embodiment is performed according to the operational status of the internal combustion engine. The ordinate axis of the graph of FIG. 2A represents angular velocity values, and the abscissa axis thereof is the time axis. The solid line in the graph of FIG. 2A shows variation of angular velocity. The ordinate axis of the graph of FIG. 2B represents angular acceleration values, and the abscissa axis thereof is the time axis. The broken line in the graph of FIG. 2B shows variation of angular acceleration.

Figure 2B:
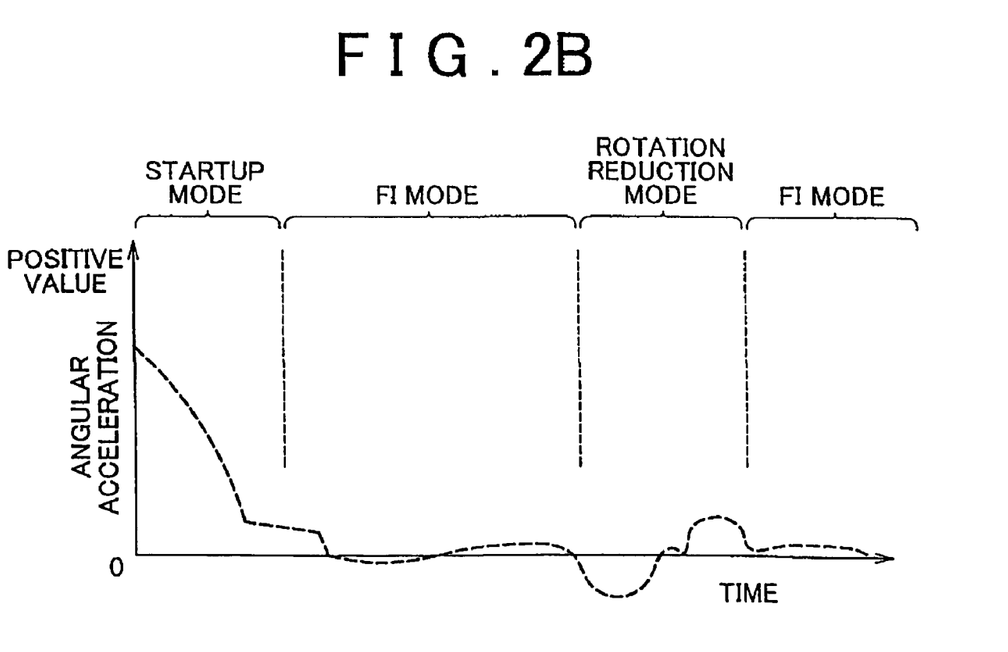
FIG. 2B is a graph showing variation of angular acceleration along the time axis while feedback control according to the embodiment is performed according to the operational status of the internal combustion engine.

As shown in FIGS. 2A and 2B, under control performed by the control section, such as the ECU (Engine Control Unit) and the CPU (Central Processing Unit), according to the embodiment, the gain-setting section (i) sets a gain using the angular acceleration as input data when it is determined that the operational status is in a startup mode or in a rotation reduction mode (examples of the first operational status according to the present invention), or (ii) sets a gain using the angular velocity as input data when it is determined that the operational status is in a fast idle mode (an example of the second operational status according to the present invention). In this way, the input data for the feedback control are switched correspondingly to the first operational status and the second operational status under control performed by the control section, such as the ECU, so that it is possible to set an optimal gain in each operational status.

Specifically, as seen from the variation during the startup mode shown in FIGS. 2A and 2B, during an operational status (startup mode), in which angular velocity is less than the desired angular velocity, that occurs during startup of the internal combustion engine until the angular velocity reaches a desired angular velocity, for example, the gain-setting section sets a gain based on the feedback control that is performed to set angular acceleration to a desired angular acceleration, such as a constant value. Accordingly, it becomes possible to significantly enhance the response of the feedback control in the period until the desired angular velocity is reached, and in addition, to realize highly precise feedback control. More specifically, as shown in FIG. 2A, angular velocity increases to the desired angular velocity, and, as shown in FIG. 2B, angular acceleration decreases from a positive value to zero.

If feedback control is performed using angular velocity (crank rotation speed) as input data, because the influence of reciprocation inertia of the pistons and others is large, it becomes impossible to accurately extract information on combustion in the internal combustion engine, that is, information indicating the level of torque produced by the gas pressure in the cylinders. Thus, it becomes technically difficult to perform appropriate feedback control under transient conditions in which angular velocity is significantly varied.

On the other hand, if feedback control is performed using angular acceleration as input data, it is possible to accurately extract information on combustion for each explosion in the cylinders of the internal combustion engine on a cylinder-by-cylinder basis, for example. Thus, during an operational status (startup mode), in which angular velocity is less than the desired angular velocity, that occurs during startup of the internal combustion engine until the angular velocity reaches the desired angular velocity, for example, it is possible to significantly enhance the response of the feedback control up to the time when the desired angular velocity is reached, and in addition, to realize a highly precise feedback control.

Meanwhile, as seen from the variation during the fast idle mode shown in FIGS. 2A and 2B, during an operational status, such as (i) an operational status (fast idle mode) in which angular acceleration is within a predetermined range of angular accelerations including zero, or (ii) an operational status (fast idle mode) in which angular velocity is within a predetermined range of angular velocities including the desired angular velocity, that occurs when the internal combustion engine is in steady operation, for example, the gain-setting section sets a gain based on the feedback control that is performed to set angular velocity to a constant value (a constant positive value) under control performed by the control section. Accordingly, it is possible to realize feedback control that makes it possible to compensate steady deviations, such as fuel properties. In addition, it is possible to realize steady feedback control that adequately meets the required response corresponding to a small variation in input data. More specifically, as shown in FIG. 2A, angular velocity is maintained at the desired angular velocity, and as shown in FIG. 2B, angular acceleration is maintained at substantially zero.

If angular acceleration is used as the input data in a relatively steady operational status in which angular velocity is substantially constant, the amount of input data is greater than needed. In this case, the control becomes unnecessarily sensitive to the input data, divergence of feedback control, such as hunting, occurs, and it becomes technically difficult to perform appropriate feedback control. In addition, when the internal combustion engine is in steady operation, the influence of the error in the time derivative due to machining error of the rotor becomes significant, and the accuracy of the calculated angular acceleration therefore becomes low. As a result, angular acceleration becomes inadequate as input data used in feedback control.

On the other hand, if the feedback control is performed using angular velocity as input data, it is possible to realize steady feedback control. Thus, when the internal combustion engine is in steady operation, for example, it is possible to realize feedback control that makes it possible to compensate steady deviations, such as fuel properties. In addition, it is possible to realize steady feedback control that adequately meets the required response corresponding to a small variation in input data.

In addition, as seen from the variation during the rotation reduction mode shown in FIGS. 2A and 2B, during an operational status (rotation reduction mode), in which angular velocity is not within a predetermined range of angular velocities including the desired angular velocity, that occurs when the internal combustion engine is in steady operation, the gain-setting section sets a gain based on the feedback control that is performed to set angular acceleration to the predetermined angular acceleration, such as a constant value (substantially zero), under control performed by the control section. More specifically, as shown in FIG. 2A, angular velocity decreases below the desired angular velocity and then increases, and as shown in FIG. 2B, angular acceleration decreases to negative values, and then increases to positive values, wherein the middle value is substantially zero.

Thus, it is possible to accurately extract changes in information on combustion for each explosion in the cylinders of the internal combustion engine on a cylinder-by-cylinder basis, for example. Thus, unexpected variation of angular velocity (crank rotation speed) when the internal combustion engine is in operation, for example, can be more quickly and accurately determined than actual variation of angular velocity, which makes it possible to quickly respond to changes in information on combustion to realize appropriate feedback control. In this way, it is possible to more quickly restore angular velocity to the desired angular velocity.

As a result, it becomes possible to set, according to various operational statuses, an optimal gain that is hardly or not affected either by changes in the external environment (temperature, for example) of the internal combustion engine, or by changes in the operational status, such as changes in torque required of the internal combustion engine, during startup of the internal combustion engine, immediately after the engine is started, or during warm up of the engine, for example. Thus, it is possible to realize highly precise control of an internal combustion engine, to realize responsive and appropriate drivability (that is, the internal combustion engine that outputs torque, appropriately and quickly responding to the operation by a driver), and to realize significant reduction in unwanted components, such as hydrocarbon, in exhaust gas.

Next, a process of feedback control according to the operational status according to the embodiment will be described with reference to FIG. 3. FIG. 3 is a flow chart showing a flow of the process of feedback control according to the operational status according to the embodiment. It should be noted that the control process is repeatedly performed by the ECU in a predetermined cycle, such as tens of microseconds and a few microseconds.

Figure 3:
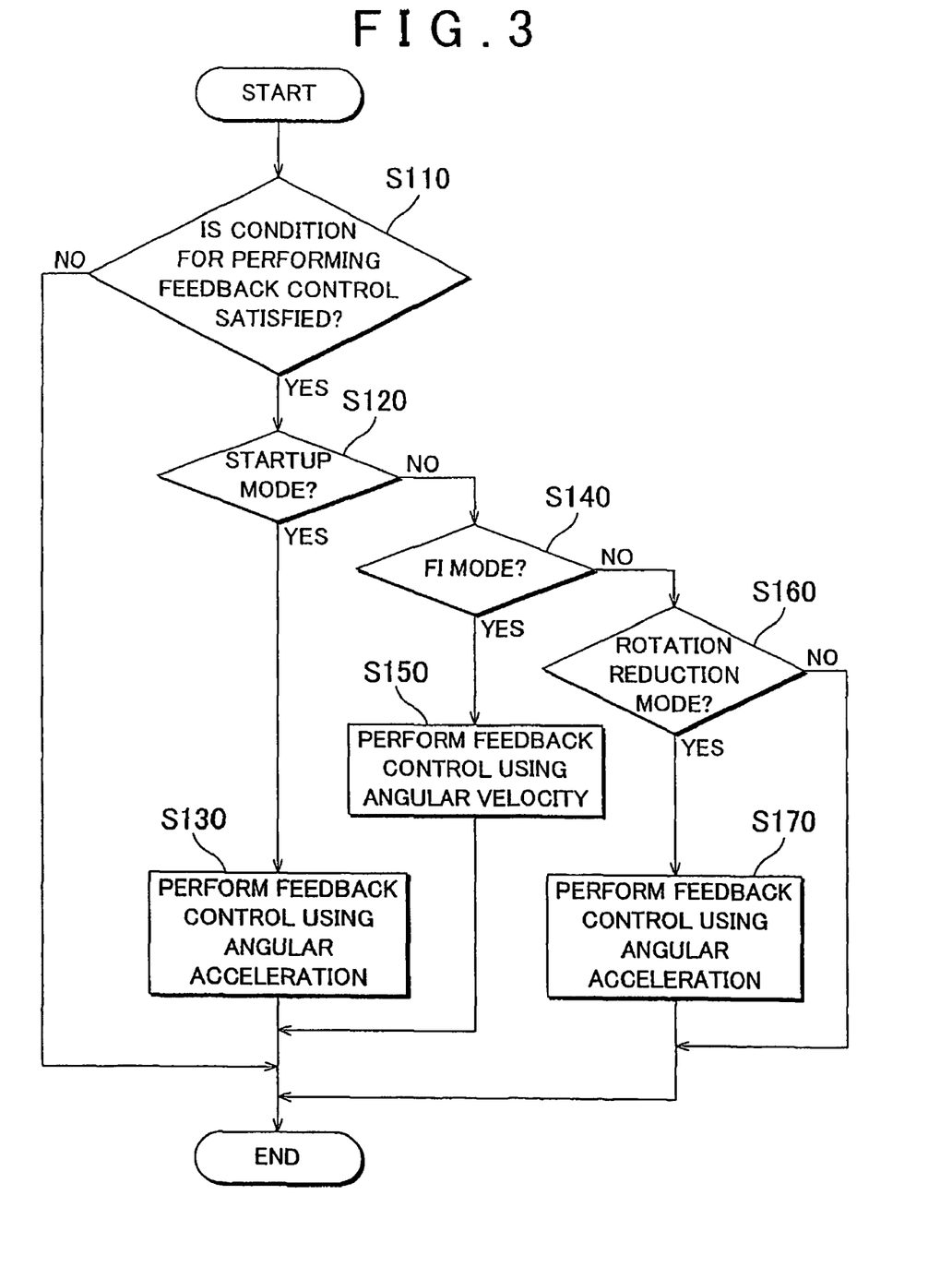
FIG. 3 is a flow chart showing a flow of a process of the feedback control according to the operational status according to the embodiment.

As shown in FIG. 3, under control performed by the ECU, it is determined whether feedback control according to the operational status should be performed (step S110). Specifically, whether feedback control according to the embodiment should be performed may be determined based on the determination as to whether the water temperature associated with the temperature of the internal combustion engine is in a predetermined range. When it is determined that feedback control according to the operational status should be performed (Yes in step S110), it is determined under control performed by the ECU whether the operational status is an operational status (in the startup mode), in which angular velocity is less than the desired angular velocity, that occurs during startup of the internal combustion engine until the angular velocity reaches a desired angular velocity, for example (startup mode) (step S120). When it is determined that the operational status is in the startup mode (Yes in step S120), a gain is set based on the feedback control using angular acceleration as the input data under control performed by the ECU (step S130).

On the other hand, in the case where it is determined in step S120 that the operational status is not in the startup mode (No in step S120), it is determined under control performed by the ECU whether the operational status is an operational status (fast idle mode), such as (i) an operational status (fast idle mode) in which angular acceleration is within the predetermined range of zero, or (ii) an operational status (fast idle mode) in which angular velocity is within the predetermined range of the desired angular velocity, that occurs when the internal combustion engine is in steady operation, for example (step S140). When it is determined that the operational status is in the fast idle mode (Yes in step S140), a gain is set based on the feedback control using angular velocity as the input data under control performed by the ECU (step S150).

On the other hand, when it is determined in step S140 that the operational status is not in the fast idle mode (No in step S140), it is determined under control performed by the ECU whether the operational status is an operational status (rotation reduction mode), in which angular velocity is not within the predetermined range of the desired angular velocity, that occurs when the internal combustion engine is in steady operation (step S160). When it is determined that the operational status is in the rotation reduction mode (Yes in step S160), a gain is set based on the feedback control using angular acceleration as the input data under control performed by the ECU (step S170). In step S170, a gain may be set based on the feedback control using the integral of angular acceleration under control performed by the ECU.

Next, a process of switching feedback control according to the operational status according to the embodiment will be described with reference to FIGS. 4 to 8 in addition to FIGS. 2A and 2B described above.

Figure 4:
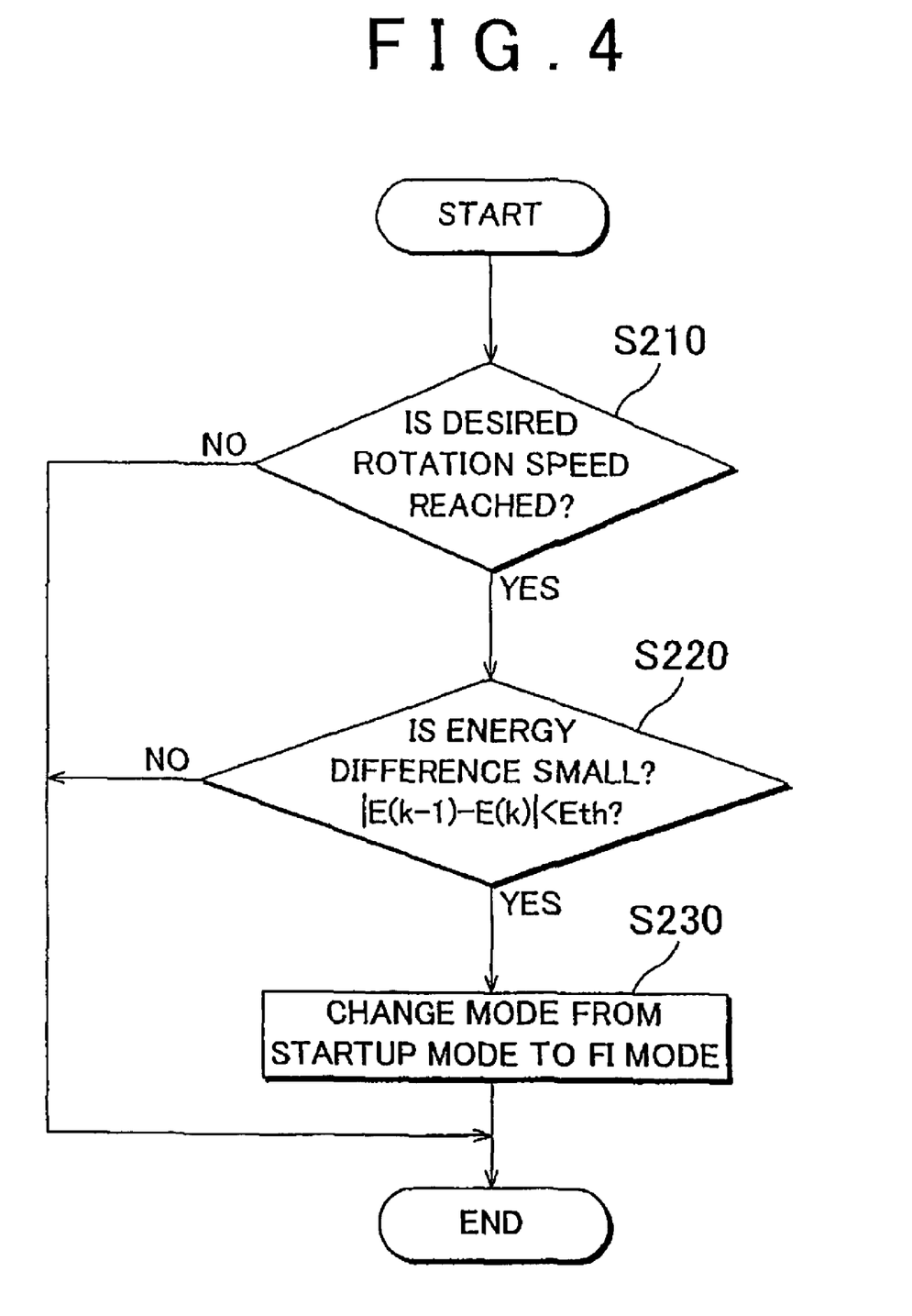
FIG. 4 is a flow chart showing a flow of a switching process performed in the feedback control according to the operational status according to the embodiment, in which process the mode is switched from a startup mode to a fast idle mode.
Figure 5:
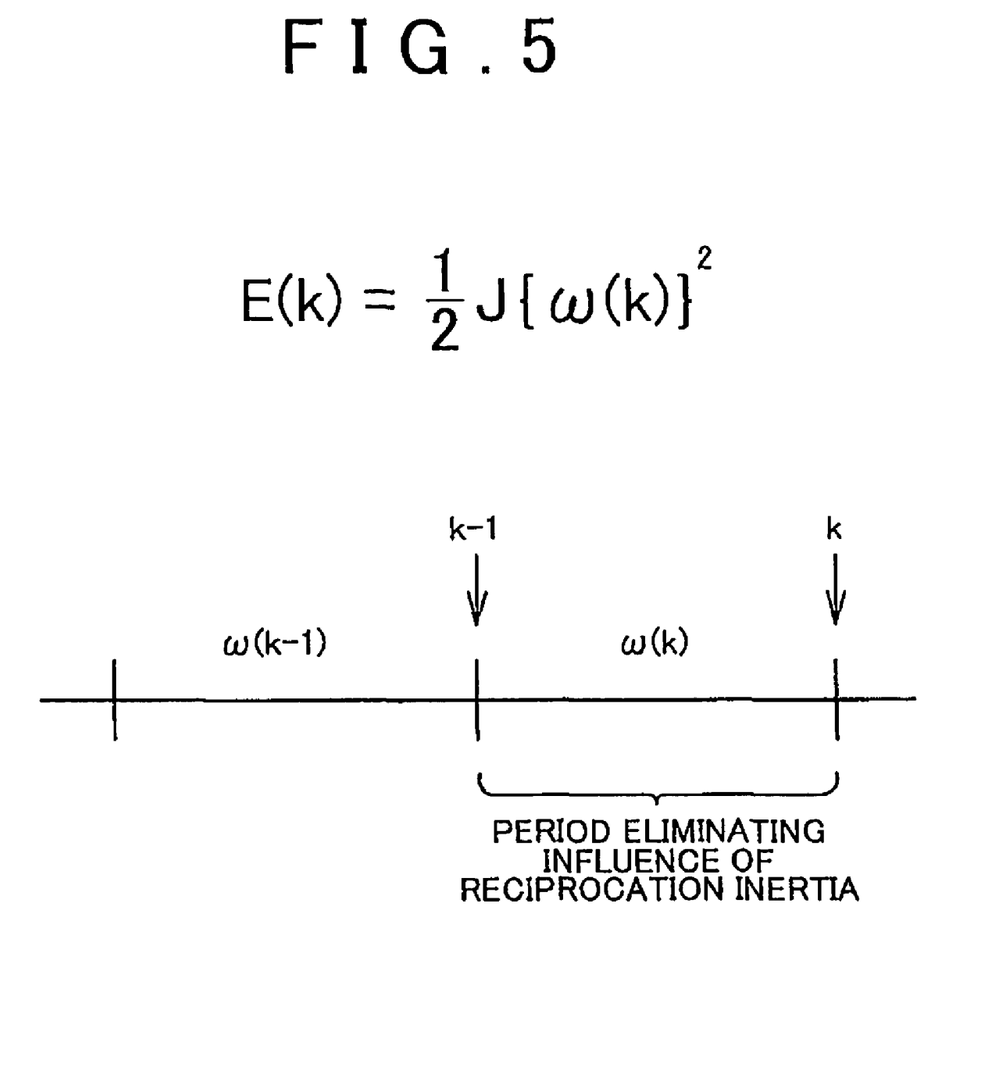
FIG. 5 is a schematic view showing predetermined periods for each of which rotational energy is calculated in the switching process performed in the feedback control according to the operational status according to the embodiment.

First, the process of switching feedback control according to the operational status according to the embodiment will be described with reference to FIGS. 4 and 5 in addition to FIGS. 2A and 2B described above. FIG. 4 is a flow chart showing a flow of the switching process performed in the feedback control according to the operational status according to the embodiment, in which process the mode is switched from the startup mode to the fast idle mode. The switching process is repeatedly performed by the ECU in a predetermined cycle, such as tens of microseconds and a few microseconds. FIG. 5 is a schematic view showing predetermined periods for each of which rotational energy is calculated in the switching process performed in the feedback control according to the operational status according to the embodiment.

As shown in FIG. 4, it is determined whether the desired angular velocity is reached under control performed by the ECU (step S210). When it is determined that the desired angular velocity is reached (Yes in step S210), it is determined under control performed by the ECU whether the rate of change in the rotational energy of the crank mechanisms (in other words, the kinetic energy of the rotating system, or the energy of angular velocity), which is calculated for each predetermined period under control performed by the ECU, is less than a predetermined rate of change (step S220). Specifically, comparison between the predetermined rate of change and the rate of change in the rotational energy calculated for each predetermined period can be made by comparing a predetermined threshold value "Eth" and the difference "E(k−1)−E(k)" between the rotational energy calculated for the (k−1)th predetermined period and the rotational energy calculated for the kth predetermined period. The predetermined threshold value "Eth" can be individually and concretely set experimentally, theoretically, empirically, or based on simulation, for example. The "rotational energy" herein means the kinetic energy of the rigid body of the rotating system. Specifically, the rotational energy can be calculated using the following equation (1).

$$E(k)=0.5 \times J \times \mathrm{sqr}\{\omega(k)\} \tag{1}$$

where "sqr" means a function that squares a number, "J" means moment of inertia of rigid bodies including the pistons and the crank mechanisms, and "$\omega(k)$" means angular velocity at the kth predetermined period. Generally, torque is calculated as the product of moment of inertia and angular acceleration.

The predetermined period of this embodiment is specified so that the average of inertial torque corresponding to inertial motion of the crank mechanisms is constant. The predetermined period is a period expressed by a crank angle range. Accordingly, when the rotational energy is calculated, it is possible to significantly reduce or eliminate the influence of the factors, such as inertial torque produced by reciprocation mass of the rigid bodies including the pistons and the crank mechanisms, on the calculation. Details of the predetermined period will be described later.

Referring back to FIG. 4, when it is determined in step S220 described above that the rate of change in the rotational energy of the crank mechanisms that is calculated for each predetermined period is less than the predetermined rate of change (Yes in step S220), the control is switched from the feedback control using angular acceleration as the input data to the feedback control using angular velocity as the input data, under control performed by the ECU (step S230). Specifically, under control performed by the ECU, the mode is switched from the startup mode to the fast idle mode described referring to FIGS. 2A and 2B. On the other hand, when it is determined in step S210 that the desired angular velocity is not reached (No in step S210), or when it is determined in step S220 that the rate of change in the rotational energy of the crank mechanisms that is calculated for each predetermined period is not less than the predetermined rate of change (No in step S220), the switching process in the feedback control according to the operational status according to the embodiment is finished under control performed by the ECU.

Consequently, it is possible to quickly set an optimal gain by switching among the above-described processes in the feedback control in which a gain is set, according to various operational statuses at appropriate times based on the rotational energy, with which it is possible to significantly reduce or eliminate the influence of the factors, such as inertial torque produced by reciprocation mass of the rigid bodies including the pistons and the crank mechanisms. Accordingly, it is possible to realize highly precise control of the internal combustion engine, and to realize responsive and appropriate drivability (that is, the internal combustion engine that outputs torque, appropriately and quickly responding to the operation by a driver).

Figure 6:
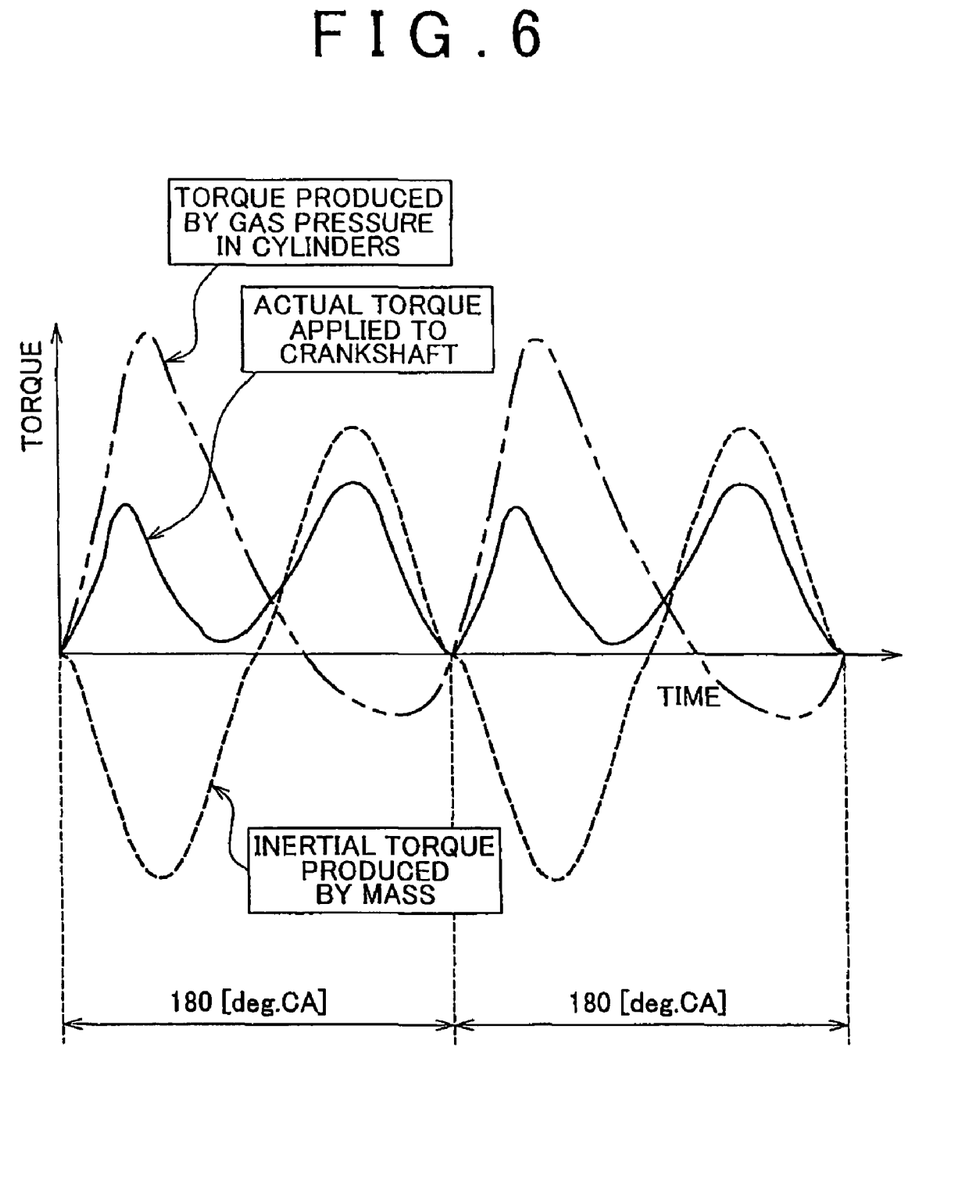
FIG. 6 is a graph schematically showing variation in the torque produced by the gas pressure in cylinders, variation in the inertial torque produced by mass, and variation in the actual torque applied to a crankshaft, according to the embodiment.
Figure 7:
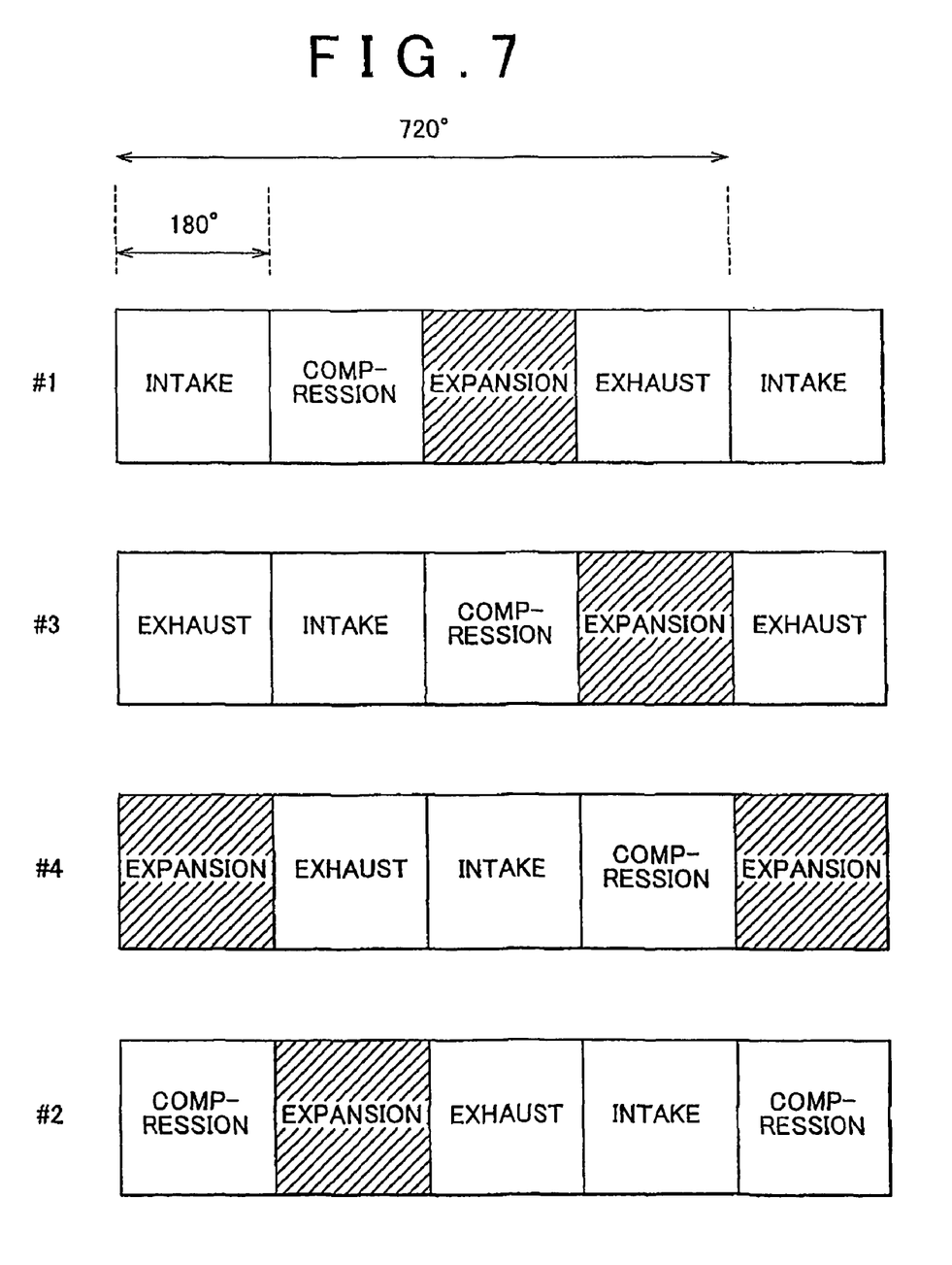
FIG. 7 is a schematic diagram showing timing sequence of the four strokes, that is, the intake stroke, the compression stroke, the expansion stroke and the exhaust stroke in the four-cylinder internal combustion engine according to the embodiment.

Next, the predetermined period used in the switching process in the feedback control according to the operational status according to the embodiment will be described with reference to FIGS. 6 and 7. FIG. 6 is a graph schematically showing variation in the torque produced by the gas pressure in the cylinders, variation in the inertia torque produced by mass, and variation in the actual torque applied to the crankshaft, according to the embodiment. In FIG. 6, the ordinate axis represents the magnitude of torque, and the abscissa axis represents the crank angle. In FIG. 6, the solid line represents variation in the actual torque applied to the crankshaft, the dotted line represents variation in the inertia torque produced by mass, and the chain double-dashed line represents the variation in the torque produced by the gas pressure in the cylinders. FIG. 7 is a schematic diagram showing the timing sequence of the four strokes, that is, the intake stroke, the compression stroke, the expansion stroke and the exhaust stroke in the four-cylinder internal combustion engine according to the embodiment. The numbers, "41" to "4", in FIG. 7 are the identification numbers used for identifying the cylinders.

As described above, the predetermined period according to the embodiment is specified so that the average of inertia torque corresponding to inertial motion of the crank mechanisms and pistons is constant. The predetermined period is a period expressed by a crank angle range. Specifically, the research conducted by the present inventors has revealed that, in a four-cylinder internal combustion engine, for example, the average and the integral of the inertia torque produced by the mass of the crank mechanisms, the pistons and others that are taken over the crank angle range of 180 degrees are substantially zero as shown in FIG. 6. Specifically, as shown in FIG. 6, it has been revealed that "the actual torque applied to the crankshaft" is the sum of "the torque produced by the gas pressure in the cylinders" and "the inertia torque produced by mass" over the crank angle range of 180 degrees.

When the processes in the feedback control in which a gain is set are switched based on the rotational energy calculated for each predetermined period of 180 degrees, it is possible to significantly reduce or eliminate the influence of the factors, such as inertial torque produced by reciprocation mass of the rigid bodies including the pistons and the crank mechanisms.

Consequently, it is possible to quickly set an optimal gain by switching among the above-described processes in the feedback control in which a gain is set, according to various operational statuses at appropriate times based on the rotational energy that is calculated for each predetermined period. Accordingly, it is possible to realize highly precise control of the internal combustion engine, and to realize responsive and appropriate drivability (that is, the internal combustion engine that outputs torque, appropriately and quickly responding to the operation by a driver).

In the case of a four-cylinder internal combustion engine, for example, as shown in FIGS. 6 and 7, the predetermined period according to the embodiment that is specified so that the average of inertia torque corresponding to inertial motion of the crank mechanisms and pistons is constant, is defined by a crank angle range of 180 degrees (=720 degrees/4). The predetermined period can be defined based on the number of cylinders of the internal combustion engine. Specifically, in the case of a six-cylinder engine, the predetermined period is defined by a crank angle range of 120 degrees (=720 degrees/6). In the case of an eight-cylinder engine, the predetermined period is defined by a crank angle range of 90 degrees (=720 degrees/8). Generally, in the case of an n-cylinder engine, the predetermined period is defined by a crank angle range of "720 degrees/n."

Figure 8:
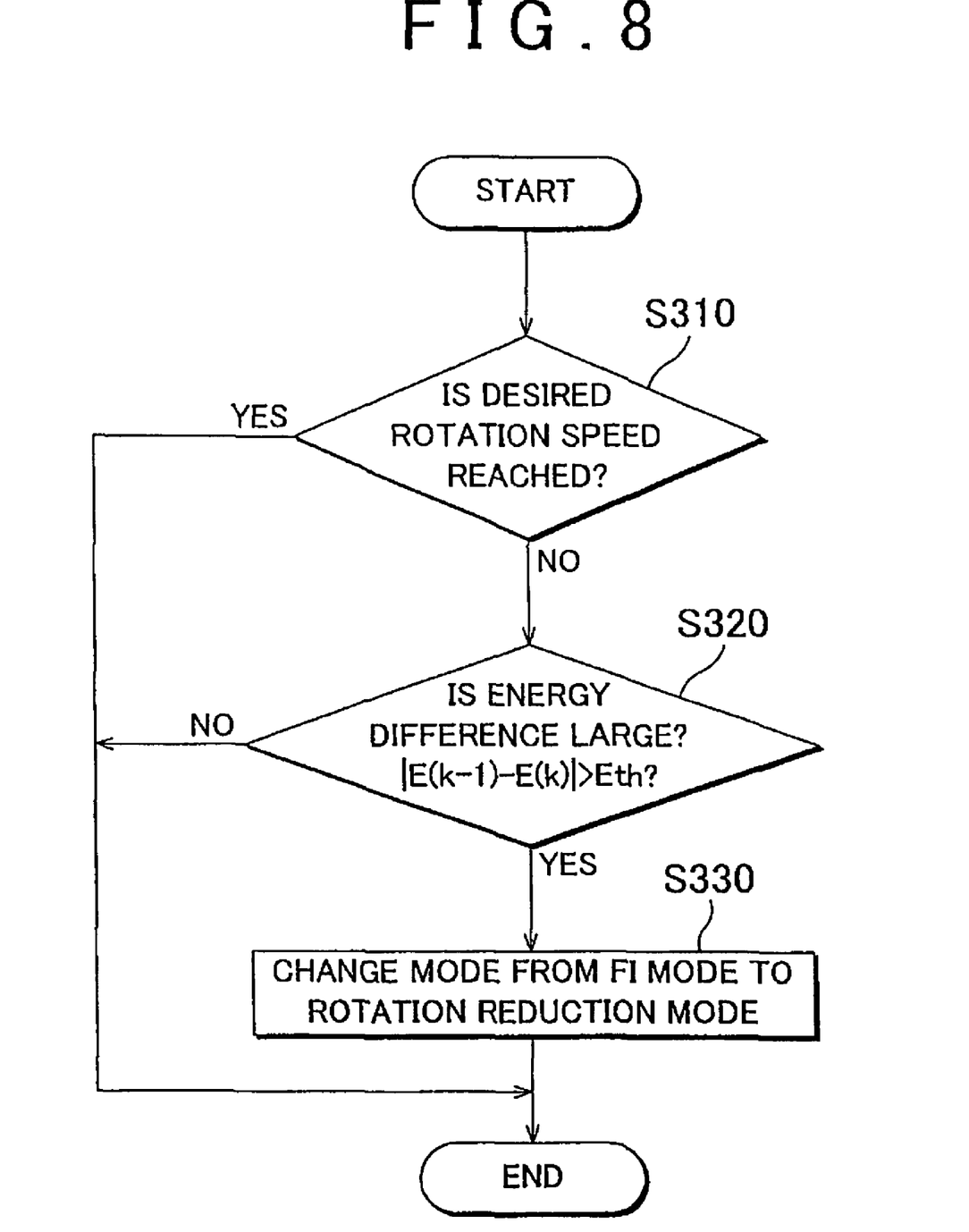
FIG. 8 is a flow chart showing a flow of the switching process in which the mode is switched from the fast idle mode to a rotation reduction mode in the feedback control according to the operational status according to the embodiment.

Next, the switching process in the feedback control according to the operational status according to the embodiment will be described with reference to FIG. 8 in addition to FIGS. 2A and 2B described above. FIG. 8 is a flow chart showing a flow of the switching process in which the mode is switched from the fast idle mode to the rotation reduction mode in the feedback control according to the operational status according to the embodiment. The switching process is repeatedly performed by the ECU in a predetermined cycle, such as tens of microseconds and a few microseconds.

As shown in FIG. 8, it is determined whether the desired angular velocity is reached under control performed by the ECU (step S310). When it is determined that the desired angular velocity is not reached (No in step S310), it is determined under control performed by the ECU whether the rate of change in the rotational energy of the crank mechanisms (in other words, the kinetic energy of the rotating system, or the energy of angular velocity), which is calculated for each predetermined period under control performed by the ECU, is less than the predetermined rate of change (step S320). Specifically, as described above, comparison can be made by comparing the predetermined threshold value "Eth" and the difference "E(k−1)−E(k)" between the rotational energy calculated for the (k−1)th predetermined period and the rotational energy calculated for the kth predetermined period.

When it is determined in step S320 that the rate of change in the rotational energy of the crank mechanisms that is calculated for each predetermined period is less than the predetermined rate of change (Yes in step S320), the control is switched from the feedback control using angular acceleration as the input data to the feedback control using angular velocity as the input data, under control performed by the ECU (step S330). Specifically, under control performed by the ECU, the mode is switched from the fast idle mode to the rotation reduction mode described referring to FIGS. 2A and 2B. On the other hand, when it is determined in step S310 that the desired angular velocity is reached (Yes in step S310), or when it is determined in step S320 that the rate of change in the rotational energy of the crank mechanisms that is calculated for each predetermined period is not more than the predetermined rate of change (No in step S320), the switching process in the feedback control according to the operational status according to the embodiment is finished under control performed by the ECU.

Consequently, it is possible to quickly set an optimal gain by switching among the above-described processes in the feedback control in which a gain is set, according to various operational statuses at appropriate times based on the rotational energy, with which it is possible to significantly reduce or eliminate the influence of the factors, such as inertial torque produced by reciprocation mass of the rigid bodies including the pistons and the crank mechanisms.

The description of the above embodiment has been made concerning ignition timing of an internal combustion engine as an example of the output data (or manipulated variable) in the feedback control. However, in the above embodiment, in addition to or instead of ignition timing, various manipulated variables (such as the amount of throttle opening, and the amount of operation of, or the control timing of valves, such as electromagnetic valves) used to control the amount of fuel injection, fuel injection timing, and air intake, for example, and/or the amount of exhaust gas recirculation, which is an external factor may be manipulated variable(s). The number of the manipulated variables may be single or multiple. The description of the embodiment has been made concerning the fast idle mode as an example of the steady operational status. However, the steady operational status may be an operational status involving fuel cut in which the vehicle is driven by inertia, for example. The description of the embodiment has been made concerning the feedback control for all the cylinders. However, the feedback control may be performed for each cylinder. In addition, because, in the embodiment, angular velocity (engine speed) is an item of data used to perform feedback control during a steady operational status, for the purpose of calculating angular velocity, it is advantageous to use the average of angular velocity taken over a crank angle range of 360 degrees, and/or use various smoothing processes in which an averaging or smoothing is performed for models representing the behavior of angular velocity. In addition, although classification into three modes, that is, the startup mode, the fast idle mode, and the rotation reduction mode, is made in this embodiment, for example, classification into two modes, or four or more modes may be adopted.

The present invention is not limited to the above-described embodiment. On the contrary, alterations and modifications can be made within the spirit of the invention recognized based on the claims and the specification, and any controllers for and control methods of internal combustion engines subjected to such alterations and modifications are also within the technical scope of the present invention.

The invention claimed is:

1. A controller for an internal combustion engine, comprising:
   a calculation section for calculating an angular acceleration or an angular velocity of a crankshaft of a crank mechanism of the internal combustion engine;
   an operational status-determining section for determining an operational status of the internal combustion engine based on the angular acceleration or the angular velocity;
   a gain-setting section for setting a gain of torque that is required to operate the internal combustion engine, based on feedback control using the angular acceleration or the angular velocity as input data; and
   a control section for controlling the gain-setting section so that, when it is determined that the operational status is a first operational status, the gain-setting section uses the angular acceleration as input data to set the gain, and when it is determined that the operational status is a second operational status, the gain-setting section uses the angular velocity as input data to set the gain.

2. The controller for an internal combustion engine according to claim 1, wherein, when the first operational status is a first starting operational status, in which the angular velocity is less than a desired angular velocity, that occurs during startup of the internal combustion engine until the angular velocity reaches the desired angular velocity, the control section controls the gain-setting section so that the gain-setting section sets the gain based on the feedback control performed to set the angular acceleration to a desired value.

3. The controller for an internal combustion engine according to claim 1, wherein, when the first operational status is a first rotation-varying operational status, in which the angular velocity is not within a predetermined range of angular velocities including a desired angular velocity, that occurs when the internal combustion engine is in steady operation, the control section controls the gain-setting section so that the gain-setting section sets the gain based on the feedback control performed to set the angular acceleration to substantially zero.

4. The controller for an internal combustion engine according to claim 1, wherein, when the first operational status is a first rotation-varying operational status, in which the angular velocity is not within a predetermined range of angular velocities including a desired angular velocity, that occurs when the internal combustion engine is in steady operation, the control section controls the gain-setting section so that the gain-setting section sets the gain based on the feedback control performed to set an integral of the angular acceleration to substantially zero or a constant value.

5. The controller for an internal combustion engine according to claim 1, wherein, when the second operational status is any one of an operational status, in which the angular acceleration is within a predetermined range of angular accelerations including zero, and an operational status, in which the angular velocity is within a predetermined range of angular velocities including a desired angular velocity, that occur when the internal combustion engine is in steady operation, the control section controls the gain-setting section so that the gain-setting section sets the gain based on the feedback control performed to set the angular velocity to a constant value.

6. The controller for an internal combustion engine according to claim 1, further comprising an energy-calculating section for calculating rotational energy of the crank mechanism based on the angular acceleration or the angular velocity,
   wherein the gain-setting section includes a first setting section that uses the angular acceleration as input data to set the gain, and a second setting section that uses the angular velocity as input data to set the gain, and
   wherein the control section switches from one of control performed using the first setting section and control performed using the second setting section to the other based on the calculated rotational energy.

7. The controller for an internal combustion engine according to claim 6, wherein
   the energy-calculating section calculates the rotational energy for each predetermined period defined by a crank angle range of the crankshaft, and,
   when the angular velocity is higher than a predetermined angular velocity and a rate of change in the rotational energy calculated for each predetermined period is less than a predetermined rate of change, the control section switches from the control performed using the first setting section to the control performed using the second setting section, or when the angular velocity is lower than the predetermined angular velocity and the rate of change in the rotational energy calculated for each predetermined period is greater than the predetermined rate of change, the control section switches from the control performed using the second setting section to the control performed using the first setting section.

8. The controller for an internal combustion engine according to claim 7, wherein
   the predetermined period is specified so that each average of torque corresponding to the inertial motion of the crank mechanism that is taken over the predetermined period is constant.

9. The controller for an internal combustion engine according to claim 7, wherein
   the predetermined period is specified based on a number of cylinders that the internal combustion engine has.

10. The controller for an internal combustion engine according to claim 7, wherein the predetermined period is specified based on the crank angle range obtained by dividing 720 degrees by the number of cylinders.

11. A controller for an internal combustion engine, comprising:
    a calculation section for calculating an angular acceleration or an angular velocity of a crankshaft of a crank mechanism of the internal combustion engine;
    an energy-calculating section for calculating rotational energy of the crank mechanism based on the angular acceleration or the angular velocity;
    a first setting section for setting a gain of torque that is required to operate the internal combustion engine, based on feedback control using the angular acceleration as input data;

a second setting section for setting a gain of torque that is required to operate the internal combustion engine, based on feedback control using the angular velocity as input data; and a control section that switches from one of control performed using the first setting section and control performed using the second setting section to the other based on the calculated rotational energy.

12. A method of controlling an internal combustion engine, comprising:

calculating an angular acceleration or an angular velocity of a crankshaft of a crank mechanism of the internal combustion engine;

determining an operational status of the internal combustion engine based on the angular acceleration or the angular velocity;

setting a gain of torque that is required to operate the internal combustion engine, based on feedback control using the angular acceleration or the angular velocity as input data; and controlling the setting step so that, when it is determined that the operational status is a first operational status, the setting step uses the angular acceleration as input data to set the gain, and when it is determined that the operational status is a second operational status, the setting step uses the angular velocity as input data to set the gain.

13. The method of controlling an internal combustion engine according to claim 12, wherein the controlling step includes setting the gain based on the feedback control performed to set the angular acceleration to a desired value when the first operational status is a first starting operational status, in which the angular velocity is less than a desired angular velocity, that occurs during startup of the internal combustion engine until the angular velocity reaches the desired angular velocity.

14. The method of controlling an internal combustion engine according to claim 12, wherein the controlling step includes setting the gain based on the feedback control performed to set the angular acceleration to substantially zero when the first operational status is a first rotation-varying operational status, in which the angular velocity is not within a predetermined range of angular velocities including a desired angular velocity, that occurs when the internal combustion engine is in steady operation.

15. The method of controlling an internal combustion engine according to claim 12, wherein the controlling step includes setting the gain based on the feedback control performed to set an integral of the angular acceleration to substantially zero or a constant value when the first operational status is a first rotation-varying operational status, in which the angular velocity is not within a predetermined range of angular velocities including a desired angular velocity, that occurs when the internal combustion engine is in steady operation.

16. The method of controlling an internal combustion engine according to claim 12, wherein the controlling step includes setting the gain based on the feedback control performed to set the angular velocity to a constant value when the second operational status is any one of an operational status, in which the angular acceleration is within a predetermined range of angular accelerations including zero, and an operational status, in which the angular velocity is within a predetermined range of angular velocities including a desired angular velocity, that occur when the internal combustion engine is in steady operation.

17. The method of controlling an internal combustion engine according to claim 12, further comprising calculating rotational energy of the crank mechanism based on the angular acceleration or the angular velocity, wherein the setting step includes a first setting step that uses the angular acceleration as input data to set the gain, and a second setting step that uses the angular velocity as input data to set the gain, and wherein the controlling step includes switching from one of control performed using the first setting step and control performed using the second setting step to the other based on the calculated rotational energy.

18. The method of controlling an internal combustion engine according to claim 17, wherein the calculating step includes calculating the rotational energy for each predetermined period defined by a crank angle range of the crankshaft, the controlling step includes switching from the control performed using the first setting step to the control performed using the second setting step when the angular velocity is higher than a predetermined angular velocity and a rate of change in the rotational energy calculated for each predetermined period is less than a predetermined rate of change, and the controlling step includes switching from the control performed using the second setting step to the control performed using the first setting step when the angular velocity is lower than the predetermined angular velocity and the rate of change in the rotational energy calculated for each predetermined period is greater than the predetermined rate of change.

19. The method of controlling an internal combustion engine according to claim 18, wherein the predetermined period is specified so that each average of torque corresponding to the inertial motion of the crank mechanism that is taken over the predetermined period is constant.

20. The method of controlling an internal combustion engine according to claim 18, wherein the predetermined period is specified based on a number of cylinders that the internal combustion engine has.

21. The method of controlling an internal combustion engine according to claim 18, wherein the predetermined period is specified based on the crank angle range obtained by dividing 720 degrees by the number of cylinders.

22. A method of controlling an internal combustion engine, comprising:

calculating an angular acceleration or an angular velocity of a crankshaft of a crank mechanism of the internal combustion engine;

calculating rotational energy of the crank mechanism of the internal combustion engine based on the angular acceleration or the angular velocity;

a first setting step of setting a gain of torque that is required to operate the internal combustion engine, based on feedback control using the angular acceleration as input data;

a second setting step of setting a gain of torque that is required to operate the internal combustion engine, based on feedback control using the angular velocity as input data; and switching from one of control performed using the first setting step and control performed using the second setting step to the other based on the calculated rotational energy.

* * * * *